US012639220B2

(12) United States Patent
Sharma

(10) Patent No.: US 12,639,220 B2
(45) Date of Patent: May 26, 2026

(54) MEMORY SUBSYSTEM SUPPORTED QUALITY OF SERVICE LEVELS FOR VIRTUALIZED STORAGE

(71) Applicant: Micron Technology, Inc., Boise, ID (US)

(72) Inventor: Prateek Sharma, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 120 days.

(21) Appl. No.: 18/790,803

(22) Filed: Jul. 31, 2024

(65) Prior Publication Data

US 2026/0037442 A1      Feb. 5, 2026

(51) Int. Cl.
*G06F 12/08* (2016.01)

(52) U.S. Cl.
CPC ...... *G06F 12/08* (2013.01); *G06F 2212/1016* (2013.01); *G06F 2212/152* (2013.01)

(58) Field of Classification Search
CPC ............. G06F 12/08; G06F 2212/1016; G06F 2212/152
See application file for complete search history.

(56) References Cited

U.S. PATENT DOCUMENTS

| | | | |
|---|---|---|---|
| 11,321,238 B2 | 5/2022 | Sharma | |
| 11,386,519 B2 * | 7/2022 | Tian | .......................... G06F 9/50 |
| 11,734,191 B2 | 8/2023 | Sharma | |
| 11,836,511 B2 | 12/2023 | Sharma et al. | |
| 12,449,976 B2 * | 10/2025 | Guo | .................... G06F 12/1081 |
| 2012/0180047 A1 * | 7/2012 | Cardona | ............. G06F 9/45558 |
| | | | 718/1 |
| 2021/0004338 A1 * | 1/2021 | Marolia | ................ G06F 3/0604 |
| 2021/0124497 A1 * | 4/2021 | Bert | ........................ G06F 3/0611 |
| 2021/0124498 A1 * | 4/2021 | Bert | ........................ G11C 16/32 |
| 2021/0124499 A1 * | 4/2021 | Bert | ........................ G06F 3/0611 |
| 2021/0406055 A1 * | 12/2021 | Kakaiya | ..................... G06F 9/52 |
| 2023/0004323 A1 * | 1/2023 | Nadakuditi | ........... G06F 3/0664 |
| 2024/0160462 A1 * | 5/2024 | Li | .......................... G06F 3/0688 |
| 2024/0264959 A1 * | 8/2024 | Ellis | ........................ G06F 13/20 |
| 2025/0321904 A1 * | 10/2025 | Thyagaturu | ............. G06F 13/42 |

OTHER PUBLICATIONS

NVM Express, "NVMe over PCIe Transport Specification", Revision 1.0, https://nvmexpress.org/wp-content/uploads/NVMe-over-PCIe-Transport-Specification-1_0-2021.06.02-Ratified.pdf, May 18, 2021, 37 pages.

* cited by examiner

*Primary Examiner* — Sean D Rossiter
(74) *Attorney, Agent, or Firm* — Brooks, Cameron & Huebsch, PLLC

(57) ABSTRACT

Memory subsystem supported quality of service (QOS) levels for virtualized storage can be provided by advertising, by the memory subsystem coupled to a host, QoS levels supported by the memory subsystem. Examples of such QoS levels can include a function level, a process address space identifier (PASID) level, and a submission queue level. The memory subsystem can receive from the host a definition of QoS parameters for at least one QoS level. The memory subsystem can provide input/output virtualized (IOV) storage while enforcing the QoS parameters via hardware of the memory subsystem.

20 Claims, 10 Drawing Sheets

100

103

104

MEMORY SUB-SYSTEM

MEMORY
SUB-SYSTEM
CONTROLLER

PROCESSOR —107

102

HOST
SYSTEM

105

MEMORY
DEVICE

LOCAL
MEMORY
108

LOCAL MEDIA
CONTROLLER

· · ·

110

QoS
CIRCUITRY —109

MEMORY
DEVICE —106

FIG. 6

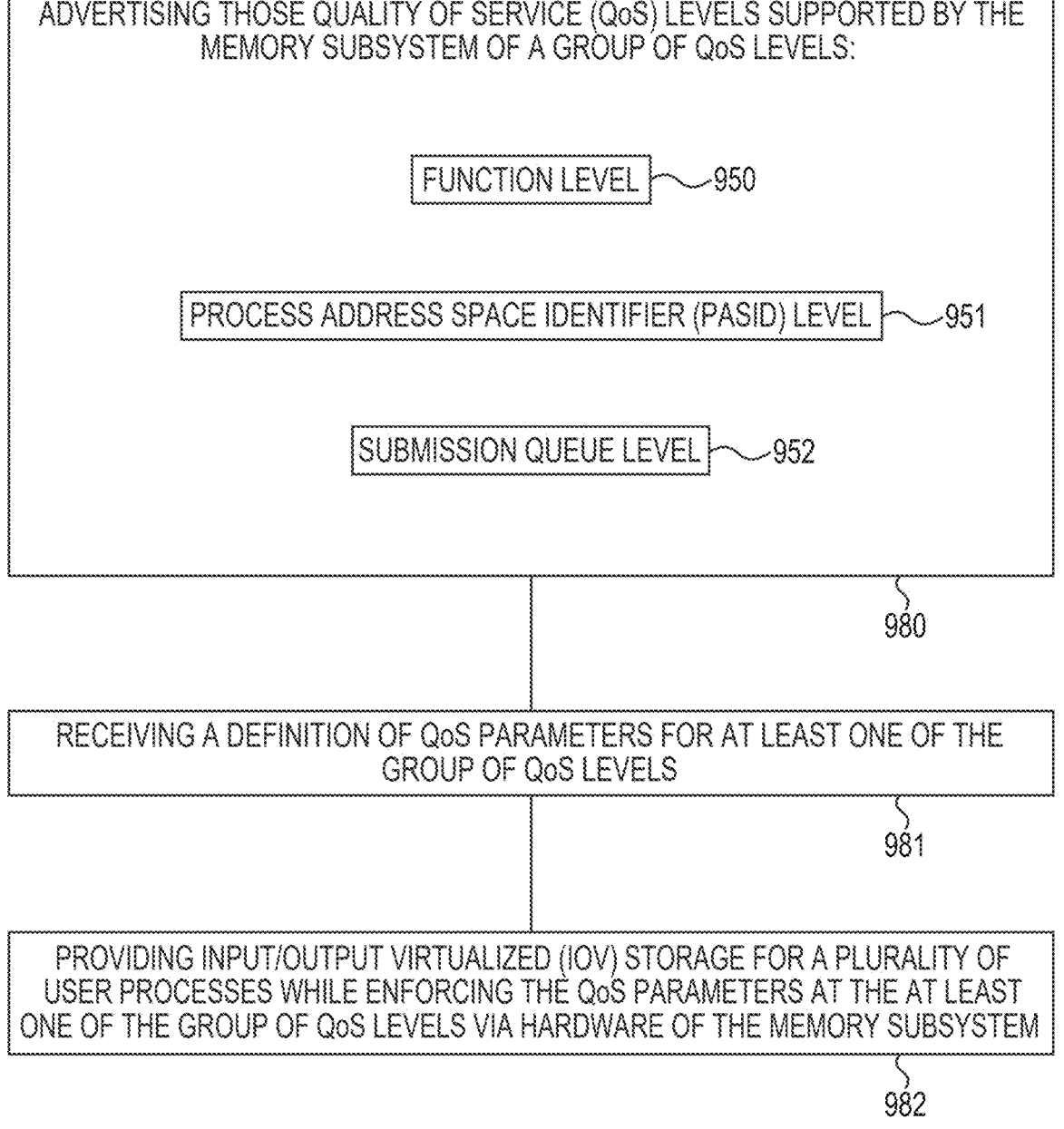

ADVERTISING THOSE QUALITY OF SERVICE (QoS) LEVELS SUPPORTED BY THE MEMORY SUBSYSTEM OF A GROUP OF QoS LEVELS:

FUNCTION LEVEL — 950

PROCESS ADDRESS SPACE IDENTIFIER (PASID) LEVEL — 951

SUBMISSION QUEUE LEVEL — 952

980

RECEIVING A DEFINITION OF QoS PARAMETERS FOR AT LEAST ONE OF THE GROUP OF QoS LEVELS

981

PROVIDING INPUT/OUTPUT VIRTUALIZED (IOV) STORAGE FOR A PLURALITY OF USER PROCESSES WHILE ENFORCING THE QoS PARAMETERS AT THE AT LEAST ONE OF THE GROUP OF QoS LEVELS VIA HARDWARE OF THE MEMORY SUBSYSTEM

MEMORY SUBSYSTEM SUPPORTED QUALITY OF SERVICE LEVELS FOR VIRTUALIZED STORAGE

TECHNICAL FIELD

Embodiments of the disclosure relate generally to memory subsystems, and more specifically, relate to memory subsystem supported quality of service levels for virtualized storage.

BACKGROUND

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 6 is a block diagram illustrating an example view and correspondence between various tables described herein.

FIG. 9 is a flow diagram illustrating an example of a method for memory subsystem supported quality of service levels for virtualized storage.

DETAILED DESCRIPTION

Figure 1:
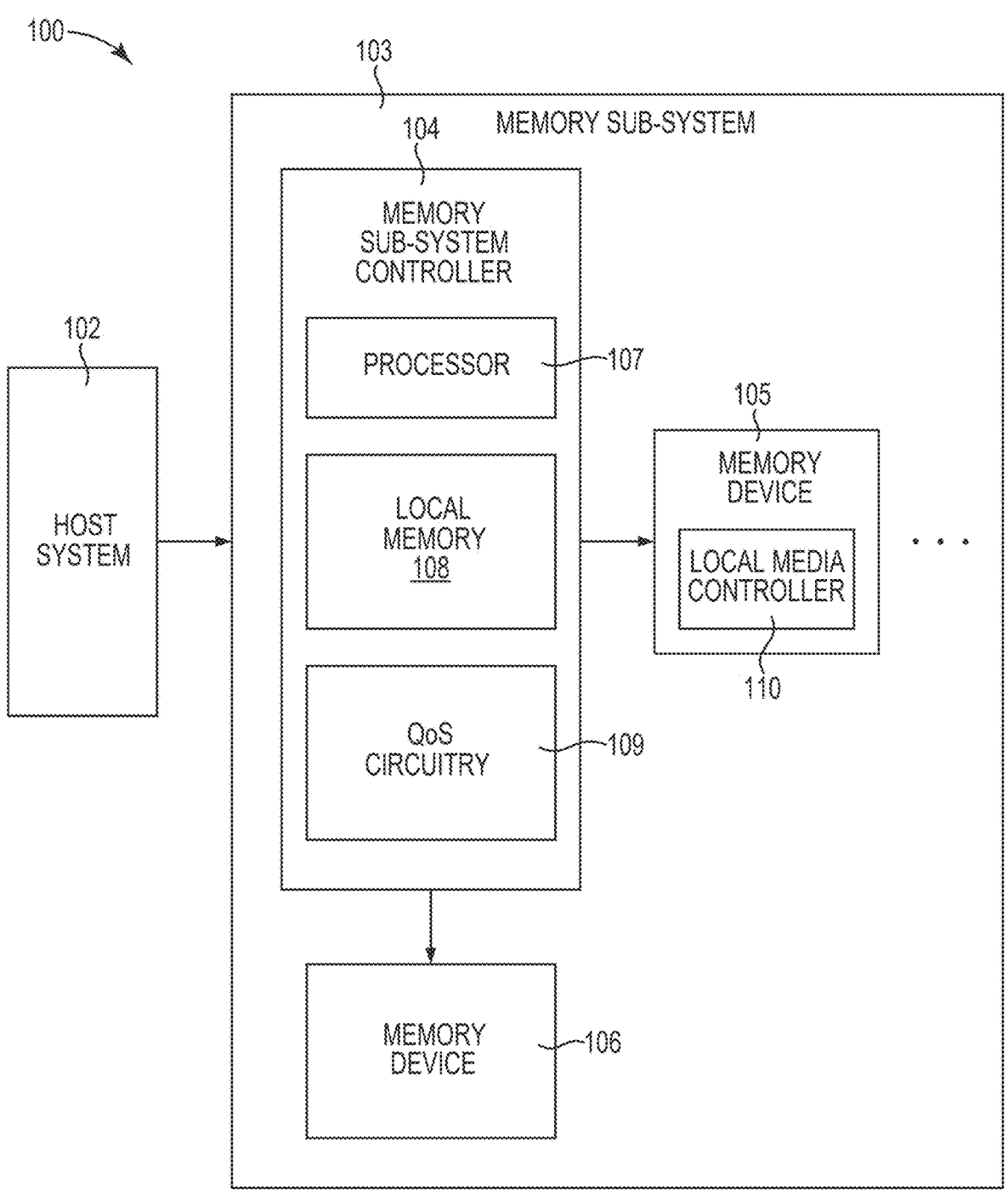
FIG. 1 is a block diagram illustrating an example of a computing system that includes a memory subsystem.

Aspects of the present disclosure are directed to memory subsystems that enforce user process quality of service (QOS) requirements for storage. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

The memory devices can include non-volatile memory devices that store data from the host system. A non-volatile memory device is a package of one or more dice. The dice in the packages can be assigned to one or more channels for communicating with a memory subsystem controller. The non-volatile memory devices include cells (electronic circuits that store information) that are grouped into pages to store bits of data. A memory subsystem controller can send and receive user data and corresponding metadata to and from memory devices. An example of a non-volatile memory device is a not- and (NAND) memory device. With NAND type memory, pages can be grouped to form blocks. Other examples of non-volatile memory devices are described below in conjunction with FIG. 1.

The term "virtual computing instance" (VCI) covers a range of computing functionality. VCIs may include data compute nodes such as virtual machines (VMs) that run on a hypervisor or container. Containers can run on a host operating system without a hypervisor or separate operating system, such as a container that runs within Linux. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

A host system can execute computer-readable instructions to implement a hypervisor. As used herein, a hypervisor (e.g., virtual machine monitor) can provide virtualization support for a number of VCIs. A VM can operate as a standalone computing device (e.g., with an operating system, applications, etc.) except that it runs in a virtualized environment provided by the hypervisor. A VM can implement a guest operating system (OS) on the virtualized environment (e.g., virtual hardware). A container can utilize a host OS to provide services to user processes executed on the container. As used herein, a user process is executed with the assistance of a host (e.g., in a virtualized environment) for a user (e.g., for a VCI or non-virtualized compute instance). A process is an executing program, such as an application.

A VCI can use virtual system hardware and a guest OS. The virtual system hardware can include at least one virtual central processing unit (CPU), virtual memory, and a number of virtual storage devices. Virtual system hardware is physical hardware of a host or other physical device that is provisioned for and used by the VCI as though it was a physical component of the VCI and as though the VCI was a physical machine. The VCI can include the guest OS and a number of drivers as needed for the various virtual storage devices. As used herein, the term "guest" can make reference to components that are part of a VCI. For example, a host platform (e.g., a computing device) can include an OS that can be referred to as a host OS and a VCI can include an OS that can be referred to as a guest OS. As used herein, a driver is software and/or hardware that can be used to control a device. For example, a driver can include software that provides an interface to control and/or manage a lower level interface that corresponds to a hardware device. A driver can also include hardware that controls a physical or virtual hardware device.

Storage generally refers to storing data persistently in non-volatile memory and is sometimes referred to as secondary storage. Examples of storage media include magnetic tape, hard disk drives, and solid state drives (SSDs). In contrast, primary storage generally refers to memory used by a processor for computation of data. Examples of primary storage include processor registers, cache, and main memory, such as random access memory. Storage virtualization is the process of presenting a logical view of the physical storage resources to a host computer system and treating the storage media (e.g., one or more SSDs) as a single pool of storage. Virtualization of storage helps achieve location independence by abstracting the physical location of data. The virtualization system presents to the user a logical space for data storage and handles the process of mapping it to the actual physical location. There can be multiple layers of virtualization and/or mapping.

Input/output (IO) virtualization (IOV) is a methodology to simplify management, lower costs, and improve performance of servers in enterprise environments. IOV environments are created by abstracting the upper layer protocols from the physical connections. To accommodate multiple applications, IOV environments demand significant connections to storage and bandwidth.

Non-volatile memory express (NVMe) is an open logical device interface specification for accessing storage media, which may be attached via a peripheral component interconnect express (PCIe) interface. NVMe is designed to capitalize on the low latency and internal parallelism of SSDs. PCIe is a high speed serial computer expansion bus standard designed to replace older standards. PCIe is used, for example, as a motherboard interface for computer graphics cards, sound cards, SSDs, and ethernet connections, among others. The PCIe standard provides support for IOV. Single root IOV (SR-IOV) is a specification that allows sharing a physical PCIe bus with different VCIs and allows isolation of PCIe resources for manageability and performance reasons.

In IOV environments where storage (e.g., an NVMe SSD) can be directly mapped to user processes running either in VCIs or directly on the host ("on bare metal"), each user process can consume all SSD resources for its own workload such that other processes sharing the same SSD experience a drop in bandwidth or experience greater latencies for their respective workloads. Due to the direct mapping, IO mediation layers (e.g., a hypervisor) in the host are typically bypassed. Therefore, there is no standardized way to enforce QoS when multiple user processes share the same SSD. With SR-IOV, a single SSD may be shared by tens to hundreds of user processes and/or VCIs, but the problem may be somewhat manageable. However, when the SSD supports process address space identification (PASID), it may be shared with thousands of user processes. Hardware based QoS solutions that work at function level granularity may not be enough to handle additional workload.

Current solutions depend on the host software to manage the storage when multiple user processes are sharing the SSD. When the host is provisioning storage, it uses queues and a way to manage them. The user processes may be independent tasks so the host may partition bandwidth of the SSD to fulfill QoS or service level agreements (SLAs) for users of the virtualized environment. The host acts as the intermediary layer if uniform sharing of SSD storage is desired. This is a relatively high latency and low bandwidth solution. Solutions related to PCIe function arbitration and QoS in shared NVMe storage may be limited to one use case where there are multiple VCIs sharing one SSD and granularity of sharing is at the VCI-level. PCIe functions are logical entities on a PCIe device that may generally appear as independent devices to an operating system, which allows one physical PCIe device with one physical connection or one set of physical connections to operate as multiple different devices, referred to as functions. PCIe functions can include physical functions and virtual functions. A physical function is a function of a PCIe device (e.g., network adapter) that supports SR-IOV and has the ability to move data in and out of the device. A virtual function is a lightweight function that shares physical resources with a physical function and other virtual functions that are associated with the physical function. Virtual functions support data flow but also have a restricted set of configuration resources. As used herein, the term "user process" can refer to a VCI (e.g., VM, container, etc.) itself, a process running on the VCI, a process running on bare metal, and/or a PCIe function. A "user process" may be referred to herein as a "QoS entity" with respect to QoS parameters being enforced for the user process as described in more detail herein. Solutions related to PASID in NVMe SSDs may be limited to PASID assignment to an NVMe queue, which does not address QoS assignments at function, PASID, and/or submission queue levels.

Aspects of the present disclosure address the above and other deficiencies by extending the scope and use cases to three modes including VCIs running on a hypervisor, user processes running inside a VCI, and user processes running directly on a host. The PASID assignment is enhanced to a queue such that QoS parameters are programmed therewith. A mechanism can be defined for a host to program the QoS parameters at three levels including function level, PASID level, and submission queue level. For QoS at the function level, PASIDs and queues belonging to a particular function can share function level QoS parameters. For QoS at the PASID level, queues belonging to a PASID of a function can share PASID level parameters. For QoS at the submission queue level, each submission queue can have its own QoS parameters, which may be referred to herein as a fine grained QoS mode.

QoS parameters can include definitions of a particular quantity of write commands per unit interval, a particular quantity of read commands per unit interval, a particular amount of write data per unit interval, and/or a particular amount of read data per unit interval. The quantity of read/write commands per unit interval can be referred to as input/output per second (IOP). The quantity of read/write data can be a specified bandwidth, such as a particular quantity of megabytes per second. A given queue, after satisfying its QoS requirements, can consume more if no other queue or process is running that has not met its QoS requirements. System software can be aware of the virtualization mode in use and can effectively divide the available QoS parameters among VCIs and/or user processes.

Advantages of the present disclosure include enabling a host to divide available NVMe bandwidth at an even finer granularity (e.g., at submission queue level or PASID level), removing the limitation of function based QoS mode where the quantity of VCIs running on a host are in the order of tens to hundreds and enabling PASID and queue modes that are scalable to thousands of VCIs, implementing QoS in hardware that consumes less power than an analogous implementation in firmware, and enabling different QoS modes for different use models, platforms, and virtualization modes, among other advantages described herein.

The figures herein follow a numbering convention in which the first digit or digits correspond to the drawing figure number and the remaining digits identify an element or component in the drawing. Similar elements or components between different figures may be identified by the use of similar digits. For example, 103 may reference element "03" in FIG. 1, and a similar element may be referenced as 203 in FIG. 2. Analogous elements within a Figure may be referenced with a hyphen and extra numeral or letter. See, for example, elements 223-1, 223-2, 223-3 in FIG. 2. Such analogous elements may be generally referenced without the hyphen and extra numeral or letter. For example, elements 223-1, 223-2, 223-3 may be collectively referenced as 223. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram illustrating an example of a computing system 100 that includes a memory subsystem 103. The memory subsystem 103 can include media, such as one or more volatile memory devices (e.g., memory device 106), one or more non-volatile memory devices (e.g., memory device 105), or a combination of such.

A memory subsystem 103 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 102 that is coupled to one or more memory subsystems 103. In some embodiments, the host system 102 is coupled to different types of memory subsystems 103. FIG. 1 illustrates an example of a host system 102 coupled to one memory subsystem 103. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 102 uses the memory subsystem 103, for example, to write data to the memory subsystem 103 and read data from the memory subsystem 103.

The host system 102 can be coupled to the memory subsystem 103 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory subsystem 103. The host system 102 can further utilize an NVMe interface to access components (e.g., memory device 105) when the memory subsystem 103 is coupled with the host system 102 by the PCIe interface. The physical host interface can provide an interface for passing control, address, data, and other signals between the memory subsystem 103 and the host system 102. FIG. 1 illustrates a memory subsystem 103 as an example. In general, the host system 102 can access multiple memory subsystems via a same communication connection, multiple separate communication connections, and/or a combination of communication connections.

The memory devices 105, 106 can include any combination of the different types of non-volatile memory devices and/or volatile memory devices. The volatile memory devices (e.g., memory device 106) can be, but are not limited to, random access memory (RAM), such as dynamic random access memory (DRAM) and synchronous dynamic random access memory (SDRAM).

Some examples of non-volatile memory devices (e.g., memory device 105) include NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 105 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 105, 106 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory devices 105, 106 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type memory (e.g., 2D NAND, 3D NAND) and 3D cross-point array of non-volatile memory cells are described, the memory device 105 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory subsystem controller 104 (or controller 104 for simplicity) can communicate with the memory devices 105, 106 to perform operations such as reading data, writing data, or erasing data at the memory devices 105, 106 and other such operations. The memory subsystem controller 104 can include hardware such as one or more integrated circuits and/or discrete components, a buffer memory, or a combination thereof. The hardware can include a digital circuitry with dedicated (i.e., hard-coded) logic to perform the operations described herein. The memory subsystem controller 104 can be a microcontroller, special purpose logic circuitry (e.g., a field programmable gate array (FPGA), an application specific integrated circuit (ASIC), etc.), or other suitable processor.

The memory subsystem controller 104 can include a processor 107 (e.g., a processing device) configured to execute instructions stored in local memory 108. In the illustrated example, the local memory 108 of the memory subsystem controller 104 includes an embedded memory configured to store instructions for performing various processes, operations, logic flows, and routines that control operation of the memory subsystem 103, including handling communications between the memory subsystem 103 and the host system 102.

In some embodiments, the local memory 108 can include memory registers storing memory pointers, fetched data, etc. The local memory 108 can also include read-only memory (ROM) for storing micro-code, for example. While the example memory subsystem 103 in FIG. 1 has been illustrated as including the memory subsystem controller 104, in another embodiment of the present disclosure, a memory subsystem 103 does not include a memory subsystem controller 104, and can instead rely upon external control (e.g., provided by an external host, or by a processor or controller separate from the memory subsystem).

In general, the memory subsystem controller 104 can receive commands or operations from the host system 102 and can convert the commands or operations into instructions or appropriate commands to achieve the desired access to the memory device 105 and/or memory device 106. The memory subsystem controller 104 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 105, 106. The memory subsystem controller 104 can further include host interface circuitry to communicate with the host system 102 via the physical host interface. The host interface circuitry can convert the commands received from the host system into command instructions to access the memory device 105 and the memory device 106 as well as convert responses associated with the memory device 105 and the memory device 106 into information for the host system 102.

The memory subsystem 103 can also include additional circuitry or components that are not illustrated. In some embodiments, the memory subsystem 103 can include a cache or buffer (e.g., DRAM) and address circuitry (e.g., a row decoder and a column decoder) that can receive an address from the memory subsystem controller 104 and decode the address to access the memory devices 105, 106.

In some embodiments, the memory devices 105, 106 include a local media controller 110 that operates in conjunction with memory subsystem controller 104 to execute operations on one or more memory cells of the memory devices 105, 106. An external controller (e.g., memory subsystem controller 104) can externally manage the memory device 105 (e.g., perform media management operations on the memory device 105). In some embodiments, a memory device 105 is a managed memory device, which is a raw memory device combined with a local controller (e.g., local controller 110) for media management within the same memory device package. An example of a managed memory device is a managed NAND (MNAND) device.

The memory subsystem controller 104 can also include QoS circuitry 109 configured to perform the QoS functionality described in more detail below. In some embodiments, the memory subsystem controller 104 includes at least a portion of the QoS circuitry 109. For example, the memory subsystem controller 104 can include a processor 107 configured to execute instructions stored in local memory 108 for performing the operations described herein.

Figure 2:
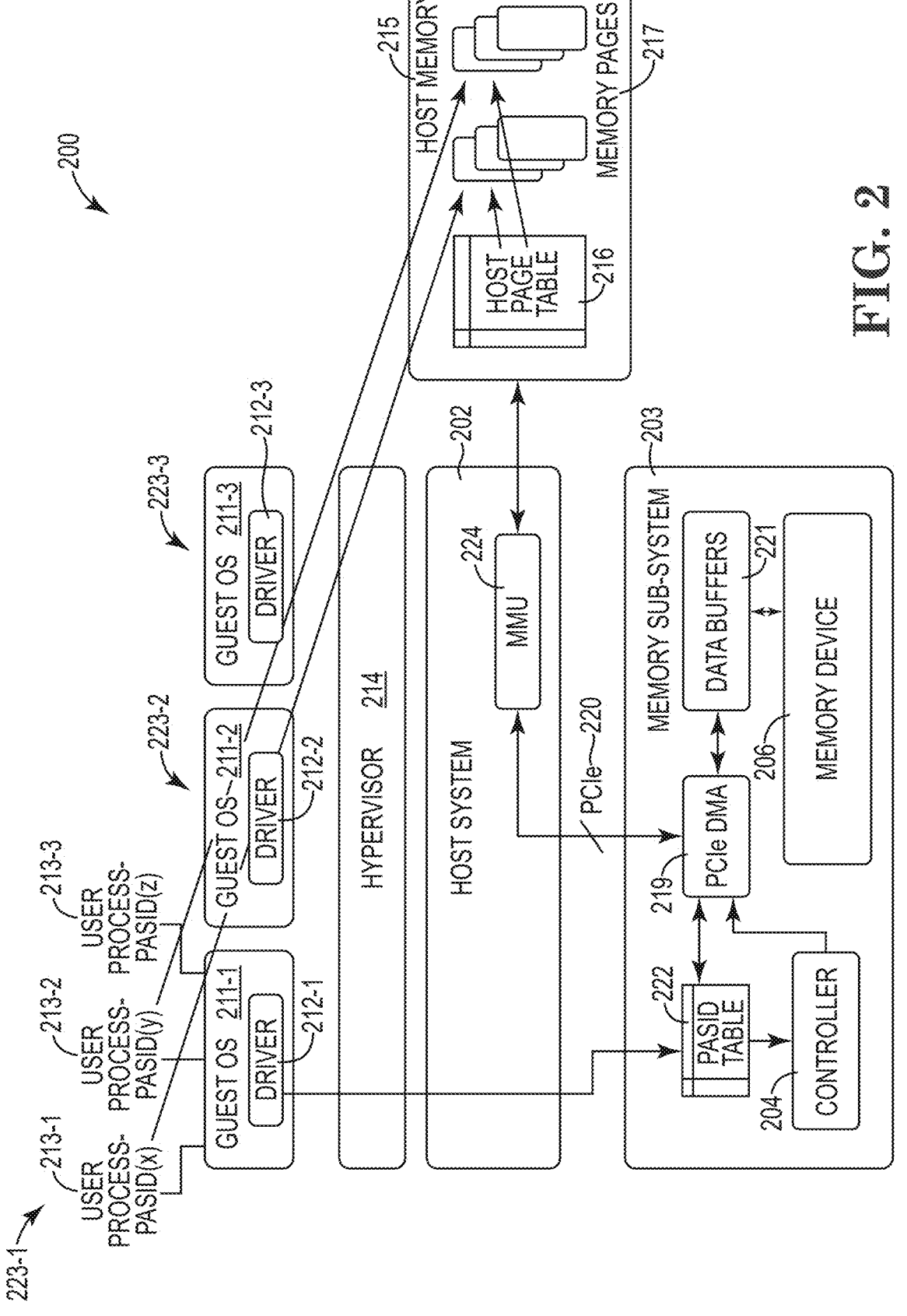
FIG. 2 is a block diagram illustrating an example of a computing system with a virtualized environment.

FIG. 2 is a block diagram illustrating an example of a computing system 200 with a virtualized environment. The computing system 200 includes the host system 202 and the memory subsystem 203.

The host system 202 can host a hypervisor 214. The hypervisor 214 can host the VCIs 223-1, 223-2, and 223-3. The host system 202 can include a memory management unit (MMU) 224 and host memory 215. An MMU is hardware that extends memory references on a memory bus and translates logical memory addresses in memory requests to physical memory addresses in main memory. The MMU 224 can use a page table with one page table entry per logical page of memory to map logical page numbers to physical page numbers. The MMU 224 can use a translation lookaside buffer as an associative cache of page table entries to avoid accessing main memory every time a logical address is mapped. Although the example of FIG. 2 is provided in the context of the hypervisor 214, embodiments are not limited to the use of a hypervisor.

Each of the VCIs 223 can include a guest OS, a driver, and a number of user processes. For example, the VCI 223-1 can include a guest OS 211-1. The guest OS 211-1 can host a driver 212-1. The guest OS 211-1 can also include user process 213-1, user process 213-2, and user process 213-3, among other possible user processes that can be hosted by the guest OS 211-1.

The VCI 223-2 includes a guest OS 211-2. The guest OS 211-2 includes a driver 212-2. The VCI 223-3 includes a guest OS 211-3. The guest OS 211-3 includes a driver 212-3. Although not shown, each of the guest OSs 211-2, 211-3 includes corresponding user processes.

The memory subsystem 203 includes a controller 204, a PASID table 222, and PCIe direct memory access (DMA) circuitry 219 referred to as PCIe DMA 219. The memory subsystem 203 can also include data buffers 221 and a memory device 206. Although not specifically illustrated as such in FIG. 2, portions of the controller 204 that are used to implement the QoS related functionality described herein can be referred to as QoS circuitry 109 as illustrated in FIG. 1.

In various examples, PASIDs can be generated and registered. As used herein, a user process identifier is an identifier that can be used to identify a particular user processes running on a guest OS and/or a host OS. A PASID is an identifier that enables the sharing of the memory subsystem 203 across the user processes 213 while providing each of the user processes 213 a virtual address space. The PASIDs can correspond to the user processes 213. Each of the user processes 213 can be assigned a different PASID.

For example, the user process 213-1 can be assigned a first PASID (e.g., PASID(x)), the user process 213-2 can be assigned a second PASID (e.g., PASID(y)), and the user process 213-3 can be assigned a third PASID (e.g., PASID (z)). The PASIDs can be used to tag direct memory access requests provided by the user processes 213 and/or direct memory accesses destined for the user processes 213.

Responsive to generating one or more of the user processes 213, the guest OSs 211 or containers (not shown) can cause corresponding drivers 212 to obtain a PASID corresponding to the user processes 213. The drivers 212 can provide commands to the MMU 224 to cause the MMU 224 to generate corresponding PASIDs. The drivers 212 can receive the PASIDs from the MMU 224. In various examples, the drivers 212 can cause a processing device of the host system 202 to provide signals to the MMU 224, where the signals correspond to the commands generated by the drivers 212. The commands provided by the drivers 212 can be provided via the hypervisor 214 to the MMU 224 without the hypervisor 214 modifying the signals.

Responsive to receiving the signals corresponding to the commands generated by the drivers 212, the MMU 224 can generate the corresponding PASIDs and can store the corresponding PASIDs and information used to perform address translation in host memory 215. The host memory 215 can comprise a host page table 216. The host page table 216 can comprise memory pages 217 which can represent data stored in the host memory 215. The memory pages 217 can comprise the PASIDs and additional data utilized to perform address translation. For example, the memory pages 217 can comprise address translations and an association between the address translations and the PASIDs.

The MMU 224 can return PASIDs to the drivers 212 corresponding to the user processes 213. The drivers 212 can then proceed to register the PASIDs with the memory subsystem 203. The drivers 212 can provide commands to the memory subsystem 203 to cause the memory subsystem 203 to store the PASIDs in the PASID table 222. The drivers 212 can also provide IDs of the user processes 213 which can correspond to the PASID. For example, the driver 212-1 can provide a first ID of the user process 213-1 and a corresponding first PASID (e.g., PASID(x)), a second ID of the user process 213-2 and a corresponding second PASID (e.g., PASID(y)), and/or a third ID of the user process 213-3 and a corresponding third PASID (e.g., PASID(z)) to the memory subsystem 203 to register the PASIDs.

The controller 204 can receive the PASIDs. The controller 204 can also receive the corresponding IDs of the user processes 213. Responsive to receipt of the PASIDs the controller 204 can cause the received PASIDs to be stored in the PASID table 222. The controller 204 can also cause the received PASIDs and the corresponding IDs of the user processes 213 to be stored in the PASID table 222. The controller 204 can also assign a queue to each of the PASIDs that is generated. As used herein, a queue is a structure that allows for commands and/or data corresponding to said commands to be stored. The commands that are stored in a queue can be retrieved from the queue and executed by the controller 204. In various examples, the PASIDs, the IDs of the user processes 213, and/or the IDs of the corresponding queues can be stored in the PASID table 222. Storing the PASIDs in the PASIDs table 222 can constitute registering the PASIDs with the memory subsystem 203.

After registering the PASIDs with the memory subsystem 203, the user processes 213 can request the translation of addresses by the memory subsystem 203 and/or can provide access commands and associated addresses to the memory subsystem 203, the execution of which can include the translation of the associated addresses. The controller 204 can receive the access command and/or associated address.

The controller 204 can receive the IDs of the user processes 213, the access command, and/or the addresses corresponding to the access commands. The controller 204 can retrieve the PASIDs corresponding to the ID of a user processes utilizing the IDs of the user processes.

In various examples, the PASIDs can be retrieved utilizing IDs of the queues corresponding to the user processes 213 that provided the PASIDs. For example, an access command or an identifier of the access command can be stored in a queue corresponding to the user process that provided the access command. A PASID corresponding to the queue can be retrieved from the PASID table 222 utilizing the ID of the queue. Regardless of whether a PASID is retrieved utilizing an ID of a process or an ID of a queue, the controller 204 can provide or cause the PASIDs and the corresponding address to be provided to the PCIe DMA 219.

The PCIe DMA 219 can provide the address and the PASID to the MMU 224 utilizing a host interface 220, such as a PCIe interface In various examples, the address can be modified by incorporating the PASID into the address. The PASID can be an address qualifier. The address can also be modified by incorporating the PASID and an ID of a memory subsystem and/or memory device into the address.

The host interface 220 can be an interface that is not utilized in a control path of the host system 202 such that providing PASIDs and/or addresses to the MMU 224 for translation utilizing the host interface 220 does not degrade the performance of a processing device of the host system 202.

In examples where there are multiple memory subsystems, the controller 204 can provide the address, a PASID corresponding to the user process that provided the address, and an ID of the memory subsystem 203 and/or the memory device 206. Providing the ID of the memory subsystem 203 and/or the memory device 206 allows the MMU 224 to translate addresses for multiple memory subsystems and/or memory devices where the multiple memory subsystems and/or memory devices utilize a similar addressing scheme. For example, the MMU 224 can translate a first address and a second address differently given that the first address and the second address are associated with different memory subsystems where the first address and the second address are the same address and both addresses are associated with the same PASID.

The MMU 224 can map virtual addresses to physical addresses. For example, the MMU 224 can map guest virtual addresses to system physical addresses. Responsive to receipt of an address, a PASID, and/or an ID of the memory subsystem 203 and/or the memory device 206, the MMU 224 can translate the address utilizing the host memory 215. As used herein, the host memory 215 can comprise memory that is internal to the host system 202 and/or is used exclusively by the host system 202. The MMU 224 can utilize the PASID and/or the ID of the memory subsystem 203 and/or the memory device 206 to translate the address utilizing the host page table 216 comprising the memory pages 217.

Responsive to translating the memory address, the MMU 224 can return the translated address to the PCIe DMA 219 utilizing the host interface 220. The PCIe DMA 219 can utilize the translated address to access the memory device 206. For instance, the translated address can be used to access the memory device 206 to read data from the memory device 206 and/or write data to the memory device 206. The data buffers 221 can be utilized to store the data retrieved from the memory device 206 or to store the data that is to be written to the memory device 206.

In various instances, the controller 204 can provide the address received from the user processes 213 and the queue ID corresponding to the user processes 213 to the PCIe DMA 219. The PCIe DMA 219 can retrieve the PASID corresponding to the queue ID. The PCIe DMA 219 can then provide the PASID, the address, and/or the ID of the memory subsystem 203 and/or the memory device 206 to the MMU 224 as described.

In various examples, the address translation can be performed by the memory subsystem 203 instead of by the MMU 224. For example, receipt of the PASIDs corresponding to the user processes 213 by the memory subsystem 203 for storage in the PASID table 222 can trigger the storage of the corresponding data used to translate addresses associated with the PASID from the host page table 216 comprising the memory pages 217. For instance, responsive to receipt of the PASIDs for storage in the PASID table 222, the controller 204 can cause the PCIe DMA 219 to request the address translations for the PASIDs.

The PCIe DMA 219 can provide the PASIDs to the MMU 224 requesting the address translations corresponding to the PASIDs. The MMU 224 can access the address translations corresponding to the PASIDs from the memory pages 217 and can provide the address translations to the PCIe DMA 219.

The PCIe DMA 219 can store the address translations in memory internal to the memory subsystem 203. For example, the address translations can be stored in the memory device 206, the data buffers 221, and/or a different memory internal to the memory subsystem 203.

Subsequent to storing the address translations in memory internal to the memory subsystem 203, the controller 204 can receive memory access commands from the user processes 213 and can receive corresponding addresses. The controller 204 can translate the received addresses, without using a processor of the host system 102, to generate translated addresses. Translating the received addresses can include utilizing a PASID corresponding to the received address and using the received address to access a translated address from the address translations. The controller can translate the received addresses without providing the received addresses to the MMU 224. The controller 204 can then cause the translated addresses to be used to access the memory device 206.

Although the examples described herein are provided in the context of user processes 213 running on VCIs 223, the examples described herein can also be implemented utilizing user processes 213 running on containers (not shown). For instance, the user processes 213 can be hosted by a container which is running on a processing device of the host system 202. The drivers 212 can also be running on containers. The drivers 212 running on a container can register the PASIDs corresponding to the user processes 213. The drivers 212 can provide access commands and associated addresses responsive to the user processes 213 requesting access to the memory subsystem 203.

The user processes 213 can be terminated in due course. The drivers 212, for example, can provide signaling to the memory subsystem 203 responsive to the termination of the user processes 213. The signaling can indicate that the user processes 213 have been terminated. The controller 204 can receive the signals indicating that the user processes 213 have been terminated.

Responsive to receipt of the signals, the controller 204 can delete a PASID corresponding to the deleted user process and/or an ID of the queue associated with the deleted user process from the PASID table 222. Deleting an entry in the PASID table 222 corresponding to the PASID of the deleted user process can disassociate the queue corresponding to the deleted user process from the PASID. Disassociating the PASID and a corresponding queue can allow the queue to be associated with a different user process responsive to the creation of a new user process. In various examples, the MMU 224 can also be informed of the termination of the user processes 213 such that the MMU 224 disassociates a PASID from the terminated user processes.

Figure 3:
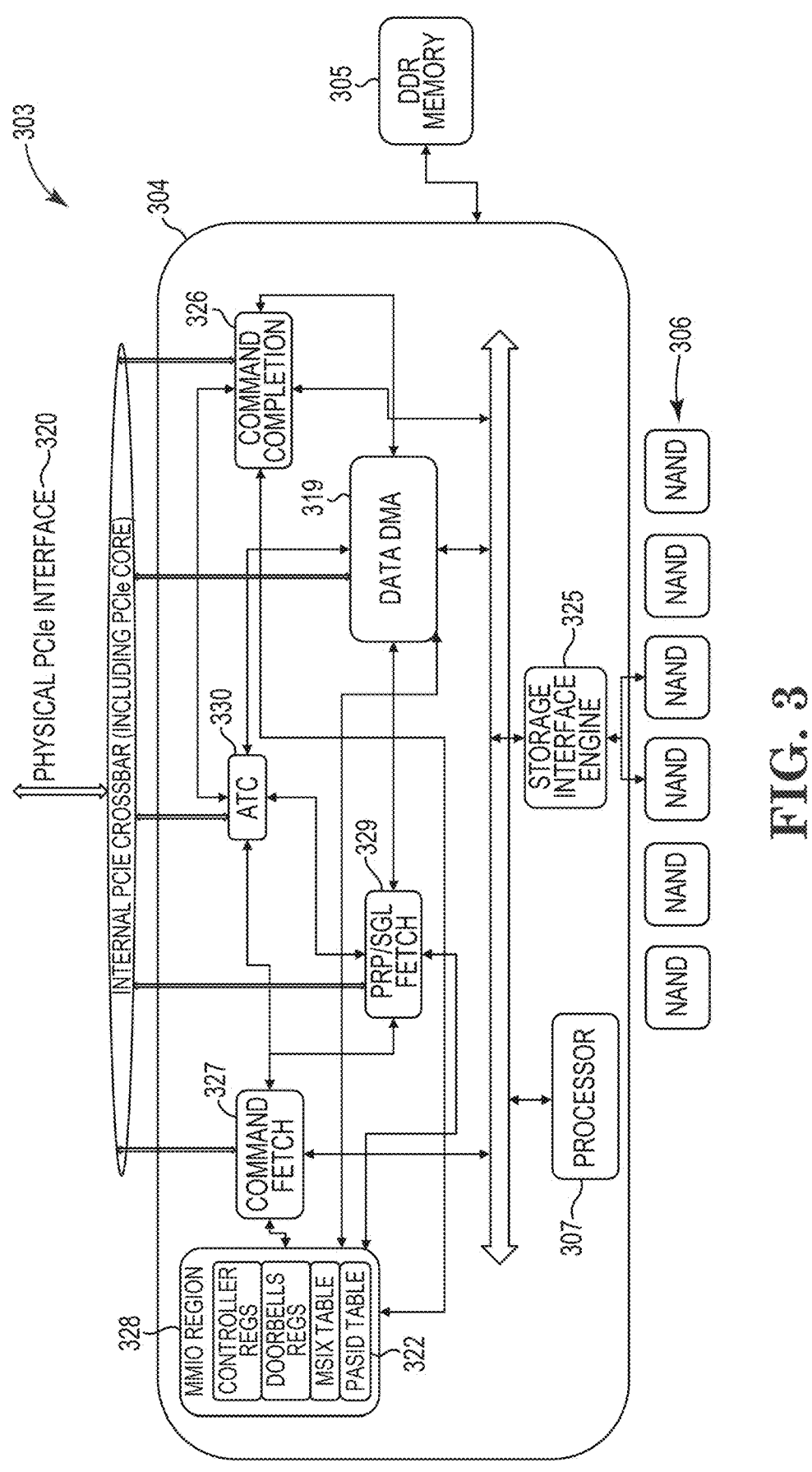
FIG. 3 is a block diagram illustrating an example of a memory subsystem in accordance with some embodiments of the present disclosure.

FIG. 3 is a block diagram illustrating an example of a memory subsystem 303 in accordance with some embodiments of the present disclosure. The memory subsystem 303 is analogous to that previously described with respect to FIG. 1 and FIG. 2 and illustrated in a different level of detail. The memory subsystem 303 includes a controller 304 coupled to a host interface 320 (e.g., internal PCIe crossbar including PCIe core), volatile memory device 305 and a number of non-volatile memory devices 306. The controller 304 is coupled to the non-volatile memory devices 306 via a storage interface 325, such as a NAND storage interface. The storage interface 325 can be coupled to a bus, which can also be coupled to a processor 307, DMA circuitry 319, command completion circuitry 326, and command fetch circuitry 327. The processor 307 can generally be configured to execute commands (e.g., memory access commands), which can be received from the host via the host interface 320. The memory subsystem 303 can include hardware logic such as counters, flags, arbitration circuitry, and circuitry configured to implement QoS algorithms, etc. The counters can measure bandwidth and/or IOPs for the memory devices 306.

The command fetch circuitry 327 can be coupled to a memory mapped input/output (MMIO) region 328 of the memory subsystem 304. The MMIO region 328 can include controller registers, doorbell registers, a message signaled interrupt-X (MSI-X) table, and the PASID table 322. The MMIO region 328 can be or can include vendor-specific registers. Vendor specific extended capability (VSEC) can be used in the PCIe configuration space. The registers can be referred to as base address registers (BARs), which can be programmed to inform the device of its resources configuration by writing configuration commands to the PCIe controller. The BARs can be PCIe physical function BARs or virtual function BARs. The controller registers can store definitions within a transport specific section of a controller properties table. The doorbell registers can include command submission queue tail doorbells and command completion queue head doorbells. The command submission queue tail doorbells can be written to the doorbell registers by a host to signal a new command. The command completion queue head doorbells can be written by the host to release a completion entry in the command completion queue. The MSI-X table can provide a command interrupt mechanism.

The host interface 320 can be coupled to the command fetch circuitry 327, physical region page/scatter gather list (PRP/SGL) fetch circuitry 329, an address translation cache (ATC) 330, the DMA circuitry 319, and the command completion circuitry 326. If a completion queue entry is posted for a command, then the host may reuse an associated PRP list for that command, but not for IO queues. The PRP/SGL fetch circuitry 329 can facilitate such transactions. The PRP/SGL fetch circuitry 329 can send read requests to data buffers and/or pointer buffers associated with commands to determine whether an address has been translated before (e.g., in association with the ATC 330). A PRP is an address including a starting page (page base address) and an optional offset that points to a PRP list at the specified address/offset, where the controller 304 can determine the physical address. A PRP maps to a physical page. An SGL is a list constructed of SGL segments, each SGL segment including one or more SGL descriptors. An SGL descriptor can include a starting address and size. An SGL is a linked list, so an SGL segment can use a pointer to the next SGL segment. An SGL can be mapped to any size of continuous physical space. The ATC 330 can store user space addresses that are tagged by PASID to system physical addresses. The ATC 330 can use PASID to convert between virtual and physical addresses. The PRP/SGL fetch circuitry 329 can send data buffer pointers to the DMA circuitry 319. The DMA circuitry 319 can request the ATC 330 to provide address translation for a given PASID and then perform a DMA data transfer based on the translation received from the ATC 330. After the transfer, the DMA circuitry 319 can decrement read and/or write bandwidth counters as described in more detail with respect to FIG. 8. The operations described herein can bypass the host input/output memory management unit (IOMMU) and go straight to host memory.

The PASID table 322 can be visible to the host via the host interface 320. In this context, the host interface 320 can serve as a programming interface with the host for the PASID table 322. The memory subsystem 303 can advertise QoS levels supported by the memory subsystem 303 to the host. Indications of the supported QoS levels can be stored in the MMIO region 328 by the memory subsystem 303. The indications of the supported QoS levels are sometimes referred to herein as "capability indicators." The host can program QoS parameters to the PASID table 322 for any supported QoS level. A custom memory subsystem 303 device driver can make IOMMU-specific application program interface (API) calls to obtain the PASID for IO thread mapped to a given submission queue, which is then programmed to the PASID table 322. The PASID table 322 is exposed to both the host and the device driver. The IOMMU is an MMU between the memory subsystem and the main memory of the host in an analogous fashion to which the host MMU (e.g., MMU 224 illustrated in FIG. 2) operates between the processor and main memory of the host. Each physical function, virtual function, or non-IOV function that uses the memory subsystem 303 for storage can use the PASID table 322. In some embodiments, each function can have its own PASID table 322. During enumeration, the OS can determine that a given function supports the capabilities described herein and hand over control to the vendor's device driver. The PASID table 322 can be offset within a BAR and have a size indicted by the VSEC in the configuration space.

The MMIO region 328 can include a first vendor-specific register, where various levels of support can be advertised to the host. A first field in the first vendor-specific register can be programmed by the controller 304 to store an indication of a size of the PASID table 322. The host can read the first field to learn the size. A second field in the first vendor-specific register can be programmed by the controller 304 to store an indication of whether the memory subsystem 303 supports QoS at the function level. Any PASIDs and/or queues belonging to a particular function can share the function level QoS parameters. A third field in the first vendor-specific register can be programmed by the controller 304 to store an indication of whether the memory subsystem 303 supports QoS at the PASID level. If a function has multiple PASIDs, each PASID can have its own QoS parameters. Any queue belonging to a PASID can share PASID level QoS parameters. A fourth field in the first vendor-specific register can be programmed by the controller 304 to store an indication of whether the memory subsystem 303 supports QoS at the submission queue level. Each queue can have its own QoS parameters, which is the most fine-grained QoS mode described herein.

A fifth field in the first vendor-specific register can be programmed by the controller 304 to store an indication of whether the memory subsystem 303 supports write commands QoS (e.g., enforcing a particular quantity of write commands, such as maximum or minimum, per unit interval). A sixth field in the first vendor-specific register can be programmed by the controller 304 to store an indication of whether the memory subsystem 303 supports read commands QoS (e.g., enforcing a particular quantity of read commands, such as maximum or minimum, per unit interval). A seventh field in the first vendor-specific register can be programmed by the controller 304 to store an indication of whether the memory subsystem 303 supports write bandwidth QoS (enforcing a particular write data per unit interval, such as a maximum or minimum amount of write data per unit interval). An eighth field in the first vendor-specific register can be programmed by the controller 304 to store an indication of whether the memory subsystem 303 supports read bandwidth QoS (enforcing a particular read data per unit interval, such as a maximum or minimum amount of read data per unit interval). The controller 304 can manipulate the values stored in the various fields of the first register to give flexibility for different vendor desires, such as read-heavy operations, write-heavy operations, etc. The values stored in the fields can be used to turn on or off various features and functionalities to meet a customer's goals, where the customer is the entity associated with the host. The fields of the first register are read-only from the hosts perspective.

A first field in a second vendor-specific register in the MMIO region 328 can be programmed by the controller 304 to store an indication of in which BAR the PASID table 322 resides. A second field in the second vendor-specific register in the MMIO region 328 can be programmed by the controller 304 to store an indication of the PASID table offset, which indicates the starting address of the PASID table 322 in the BAR. The fields of the second register are read-only from the hosts perspective.

A third vendor-specific register in the MMIO region 328 can be programmed by the host (e.g., by a VCI provisioned by the host) to store an indication of which QoS level is selected by the host. The memory subsystem 303 can thereby receive a selection of one of the QoS levels from the host. The controller 304 can enable the selected QoS level in response to receipt of the selection thereof by the host. Enabling the QoS level means that the memory subsystem 303 will enforce the defined QoS parameters at that QoS level as described in more detail herein. Examples of such QoS levels include no QoS, function level QoS, PASID level QoS, and submission queue level QOS, among others. Enforcing a QoS parameter at a QoS level means that any user processes operating at the QoS level (e.g., using a PASID, submission queue, or function) is restricted at the QoS level according to the QoS parameter. For example, the QoS parameter of a specific limitation to write bandwidth can be applied at the QoS level of a per-PASID basis (e.g., a user process for each PASID is write bandwidth limited). The fields of the third register are read/write from the hosts perspective.

As visible to the host, the PASID table 322 can store a plurality of data words for each entry in the PASID table 322, where each entry can correspond, for example, to a submission queue (SQ)/completion queue (CQ) pair. The various data words and fields described herein are just one example, as other arrangements can be used. A first data word can be programmed by the host (e.g., a device driver running in a guest OS, host OS, or hypervisor) with PASIDs for a given NVMe SQ. The NVMe CQ mapped to this NVMe SQ is also implicitly associated with this PASID. A second data word in the PSID table 322 can be programmed by the host with NVMe SQ identifiers (SQIDs).

A first field in a third data word in the PASID table 322 can be programmed by the host to store an indication of whether the SQID to PASID association is valid. If indicated as valid, the memory subsystem 303 is enabled to send the PASID in the first data word in command fetches, command completions, pointer fetches, and data DMA associated with the SQID. If not indicated as valid, the memory subsystem 303 may not use the PASID in the first data word in PCIe transaction layer packets. IOs for the submission queue use this PASID. This can be useful for address mapping in the host MMU and/or in the ATC 330 of the memory subsystem 303.

A second field in the third data word can be programmed by the host to store an indication of whether QoS at the function level is valid. If indicated as valid, QoS parameters programmed in the PASID table 322 are considered valid for enforcing QoS at the function level for PASIDs and queues of the function. A third field in the third data word can be programmed by the host to store an indication of whether QoS at the PASID level is valid, which is mutually exclusive versus the indication of whether QoS at the function level is valid (both indications cannot be programmed as being valid for a given function). If QoS at the PASID level indicated as valid in the third data word, QoS parameters programmed in the PASID table 322 are considered valid for enforcing QoS at the PASID level. If neither the indication of QoS at the function level nor QoS at the PASID level is indicated as being valid, then QoS at the submission queue level can be valid by default. The controller 304 can read the second and third fields to determine at which level to apply QoS. The indication of the level at which QoS should be applied can be referred to as a selection of one of the QoS levels by the host.

A fourth field in the third data word can be programmed by the host to store an indication of whether the particular QoS entity is bound by write commands QoS parameters. A fifth field in the third data word can be programmed by the host to store an indication of whether the particular QoS entity is bound by read commands QoS parameters. A sixth field in the third data word can be programmed by the host to store an indication of whether the particular QoS entity is bound by write bandwidth QoS parameters. A seventh field in the third data word can be programmed by the host to store an indication of whether the particular QoS entity is bound by read bandwidth QoS parameters. The controller 304 can read the fourth, fifth, sixth, and seventh fields to determine which QoS parameters to enforce.

A fourth data word in the PASID table 322 can be programmed by the host to store definitions of a credit structure for the various QoS parameters. The fourth data word can be programmed by the host to store indications of whether the QoS entity is limited to any particular number of credits. The fourth data word can be programmed by the host to store indications of whether the QoS entity is limited to a nominal credit value for any of the QoS parameters as defined in the fifth, sixth, seventh, or eighth data words. If so limited, the QoS entity may not exceed that number of credits for the particular QoS parameter. The fourth data word can be programmed by the host to store indications of whether the QoS entity is limited to a nominal credit value plus a multiplier for any of the QoS parameters as defined in the fifth, sixth, seventh, or eighth data words. If so limited, the QoS entity can exceed the limit by the defined multiple if there is excess available (e.g., excess bandwidth, speed) after the memory subsystem 303 services other submission queues that are bound by their nominal values. The host can program the fourth data word with unit intervals for any of the QoS parameters. Unit intervals can be, for example, a particular quantity of time, such as microseconds, milliseconds, seconds, etc. The host can program the fourth data word with definitions of the multiplier for any QoS entity/QoS parameter combination. Examples of the multiplier include 1×, 2×, 8×, 64×, etc.

The controller 304 can program a fifth data word in the PASID table 322 to store a nominal value of write commands that can be executed in a given time interval according to the capabilities of the memory subsystem 303. The host can read this information and program the fifth data word to store a definition of a number of write command credits per unit interval. A write command credit can be a number of write commands.

The controller 304 can program a sixth data word in the PASID table 322 to store a definition of a nominal value of read commands that can be executed in a given time interval according to the capabilities of the memory subsystem 303. The host can read this information and program the sixth data word to store a definition of a number of read command credits per unit interval. A read command credit can be a number of read commands.

The controller 304 can program a seventh data word in the PASID table 322 to store a nominal value of the write bandwidth in terms of an amount of data per unit interval according to the capabilities of the memory subsystem 303. The host can read this information and program the seventh data word to store a definition of a number of write bandwidth credits per unit interval. A write bandwidth credit can be a particular amount of data.

The controller 304 can program an eighth data word in the PASID table 322 to store a nominal value of the read bandwidth in terms of an amount of data per unit interval according to the capabilities of the memory subsystem 303. The host can read this information and program the eighth data word to store a definition of a number of read bandwidth credits per unit interval. A read bandwidth credit can be a particular amount of data.

For a command fetch, the command fetch circuitry 327 can prepare IO operations by updating the doorbell register. The command fetch circuitry 327 can retrieve a PASID for the command from the PASID table 322 and determine whether the PASID has been cached via the ATC 330. If not, the ATC 330 can send a translation request to the host via the host interface 320. The command fetch circuitry 327 can allow the command to go through the command execution pipeline via the PRP/SGL fetch circuitry 329, DMA circuitry 319, and command completion circuitry 326. After the command is fetched, credits can be decremented as described in more detail with respect to FIG. 8.

The command completion circuitry 326 can signal a command completion to the host after the DMA circuitry 319 has completed the transfers associated with the command. The command completion circuitry 326 can retrieve the PASID and ask for translation from the ATC 330, update if necessary.

Figure 4:
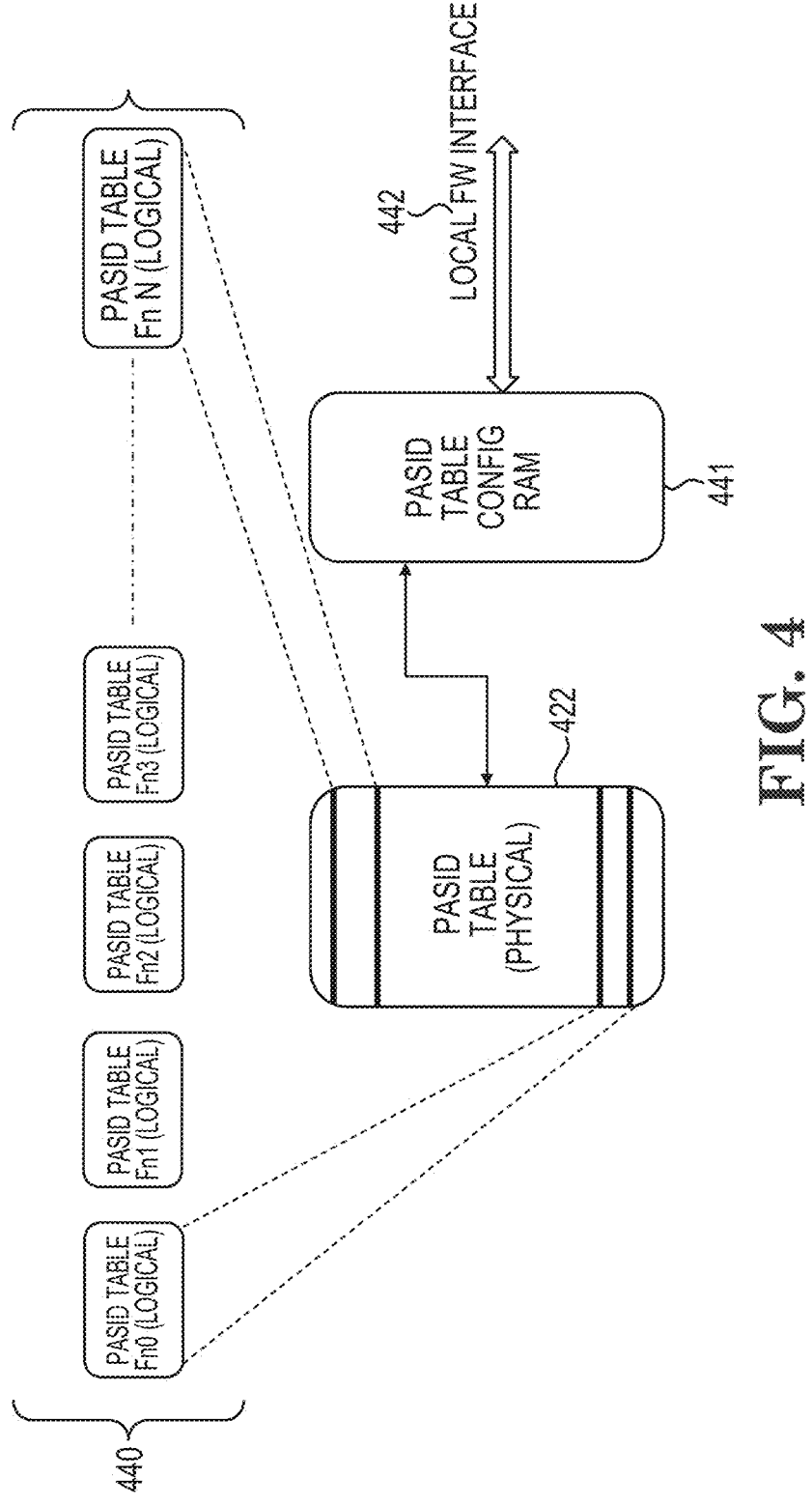
FIG. 4 is a block diagram illustrating an example of a process address space identification (PASID) table.

FIG. 4 is a block diagram illustrating an example of a PASID table 422. As illustrated, the memory subsystem includes one PASID table, which is stored physically in the MMIO region as indicated in FIG. 3. However, from the host's perspective, there can be multiple logical PASID tables 440. For example, there can be one logical PASID table 440 per PCIe function (e.g., virtual or physical function). The logical PASID tables 440 are exposed to the host and include some read/writable areas as described above with respect to FIG. 3. Each logical PASID table 440 can be mapped to various entries in the PASID table 422 that is stored in the memory subsystem. The PASID table 422 stored in the memory subsystem can be accessed by the controller of the memory subsystem and configured in RAM of the memory subsystem as illustrated at 441. A local firmware interface 442 of the memory subsystem can provide access to the PASID table configuration 441.

The firmware of the memory subsystem can configure the PASID table configuration 441 at bootup of the memory subsystem or at another time, for example if a VCI running on the host that accesses a logical PASID table 440 is reset or a new VCI is added. The PASID table configuration 441 is not exposed to the host, but can be used by the memory subsystem to divide the PASID table 422 into logical PASID tables 440 on a per-function basis, such as for each process or host that makes use of the logical PASID tables 440. The depth of the PASID table configuration 441 is analogous to that of the PASID table 422. The width of the PASID table configuration 441 is based on the number of functions and the depth of the PASID table 422.

The firmware can program each entry in the PASID table configuration 441 with the port, function, offset for the external logical PASID table 440, and an internal index to the PASID table 422. When the host tries to read or write a logical PASID table 440, a lookup is performed by the memory subsystem in the PASID table configuration 441 to match the target (e.g., port, function, index, etc.). The internal index for the PASID table 422 is retrieved based on the lookup. In some embodiments, the internal index for the PASID table 422 can be the same as the internal SQID number. The internal index is unique (e.g., one for each submission queue), but the external index may be shared in a manner similar to logical addressing. Each host access is operated on by a respective lookup in the PASID table configuration 441. In some embodiments, indices to the PASID table configuration 441 can be hashed to improve the efficiency of the lookup.

Enumeration software can discover the PASID programming capability of the memory subsystem via the VSEC in the PCIe configuration space. Each virtual or physical function can represent a respective (virtual) memory subsystem controller (parent or child) with its own PASID table 440 that gets bound to its own device driver. An administrator queue and IO queue PASID can be programmed in the PASID table 440 using MMIO (register writes) by a device driver, hypervisor, host OS, guest OS, etc.

Figure 5:
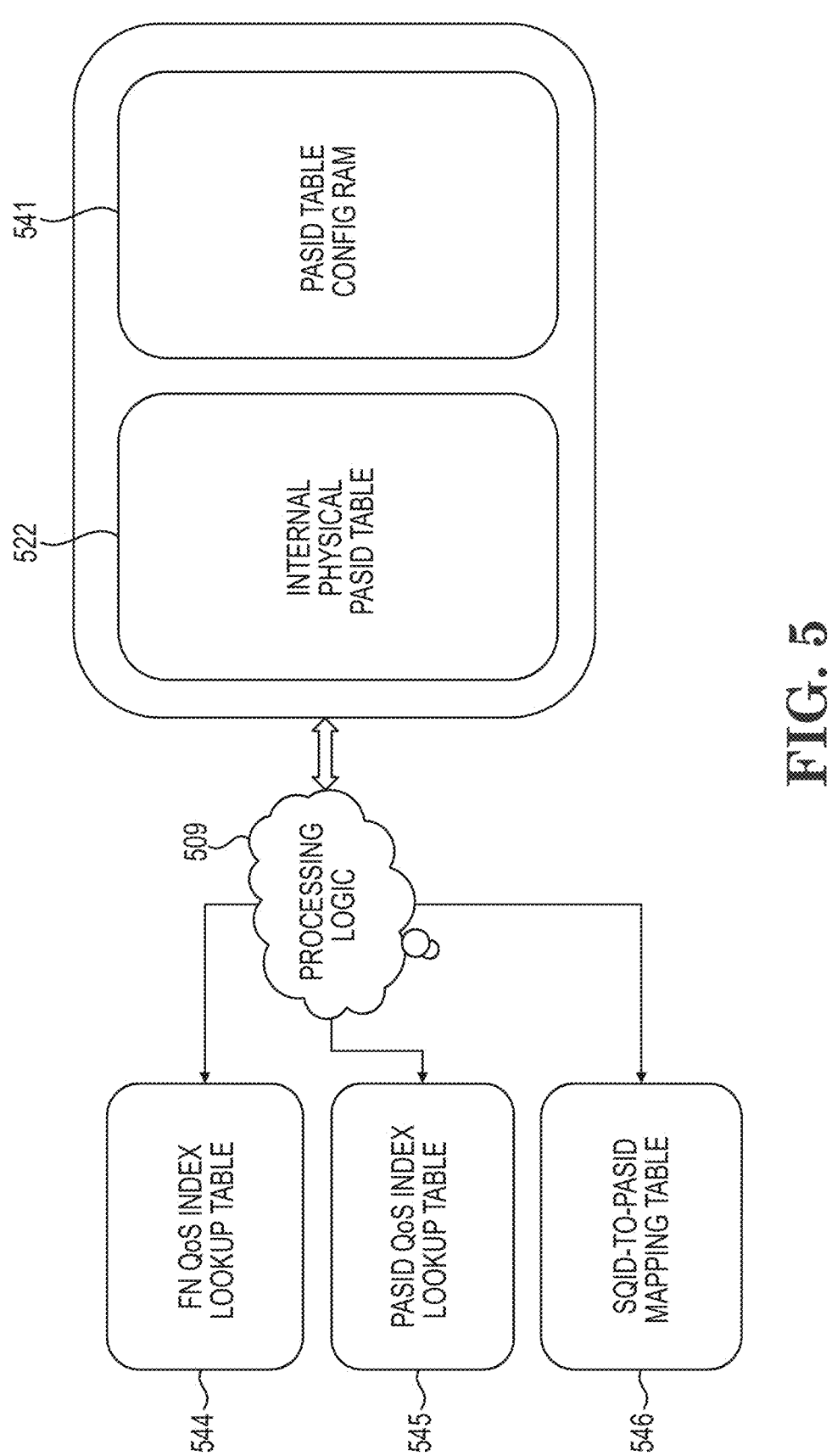
FIG. 5 is a block diagram illustrating an example of PASID table processing hardware.

FIG. 5 is a block diagram illustrating an example of PASID table processing hardware. Processing logic 509 can be circuitry associated with a controller of a memory subsystem, such as is illustrated in FIG. 1, or another ASIC or processor. The processing logic 509 can interface with a function QoS index lookup table 544, a PASID QoS index lookup table 545, and a SQID to PASID mapping table 546 to exchange information therewith and operate on said information. The processing logic can also interface with the PASID table 522 and/or PASID table configuration 541. The function QoS index lookup table 544, PASID QOS index lookup table 545, and SQID to PASID mapping table 546 can be managed by the processing logic 509 to infer what the host is trying to do so that the entire PASID table 522 does not have to be searched for each request.

QoS parameters for various functions can be indexed and stored in the function QoS index lookup table 544. The function QoS index lookup table 544 can be used to find the index in the PASID table 522 where the host will program the QoS parameters in response to function level QoS being enabled. The host can program the QoS parameters at a first index of a function's PASID table 522. In response to the host programming the second field in the third data word in the PASID table 522 to store the indication that QoS at the function level is valid, the processing logic 509 can cause information to be stored in the function QoS index lookup table 544 including an address, PASID table index, and write data. The address is from the host write and can include an indication of the port and function. The PASID table index is internally based on host writes and can include a target port, target function, and/or an MMIO PASID table offset. When it is time to fetch a command from a submission queue, the processing logic 509 can check the QoS mode of the submission queue (port and function) and if the mode is QoS at the function level, then the processing logic 509 can read the function QoS index lookup table 544 to get the PASID table index where the QoS parameters are stored.

QoS parameters for various PASIDs can be indexed and stored in the PASID QoS index lookup table 545. The PASID QoS index lookup table 545 can be used to find the index in the PASID table 522 where the host will program the QoS parameters when QoS is enabled at the PASID level. The host can program the QoS parameters when the PASID is created during an opening of the function's resources by a user process. In response to the host programming the third field in the third data word in the PASID table 522 to store the indication that QoS at the PASID level is valid, the processing logic 509 can cause information to be stored in the PASID QoS index lookup table 545 based on the host write, including a target port, a target function, MMIO PASID table offset. Hashing can be used to improve efficiency. By way of example, a hash key can be based on information including port, function, and PASID from the PASID table 522. The index can be hashed with the hash key and a hash function, which can take the PASID table depth into account. Writes to the PASID QoS index lookup table 545 can be performed using the hashed index as an address and write data including the hash key and the PASID table index, among other information. When it is time to fetch a command from a submission queue, the processing logic 509 can compute the same hash using the submission queue's port, function and external SQID and use that to index into the PASID QoS index lookup table 545 to get the PASID table index where the actual PASID is stored.

Mappings between SQIDs and PASIDs can be stored in the SQID to PASID mapping table 546. The SQID to PASID mapping table 546 can store a correspondence between PASID table indices and information including a port, function, and external SQID. The PASID mapping table 546 can be used by the processing logic 509 to fetch a command from a given submission queue rather than manually scanning the PASID table 522 to find the PASID for the submission queue, which would take more clock cycles thereby causing an impact on bandwidth and latency. In response to the host programming the third data word in the PASID table 522 to indicate that QoS at the submission queue level is valid (e.g., by default due to not storing an indication that QoS at another level is valid), the processing logic 509 can cause information to be stored in the SQID to PASID mapping table 546. The information stored in the SQID to PASID mapping table 546 can be indicative of an association between the internal PASID table 522 and port, function, and SQIDs. More specifically, in response to the host programming the third data word in the PASID table 522, the processing logic 509 can retrieve the PASID table index from the PASID table configuration (e.g., as illustrated at 441 in FIG. 4), read the third data word to get the SQID, and write to the SQID to PASID mapping table 546. The writing to the SQID to PASID mapping table 546 can include an address and data. The address can be a hashed index. The hashed index can be calculated based on a hash key, which is based on the target port number from the host write, target function number from the host write, and SQID from the second data word, for example. The hash key can be fed into a hash function, which takes the PASID table depth into account. The data can include the hash key and PASID table index, among other data. When it is time to fetch a command from a submission queue, the processing logic 509 can compute the same hash using the submission queue's port, function, and external SQID and use that to index into the PASID mapping table 546 to get the PASID table index where the actual PASID is stored.

Figure 6:
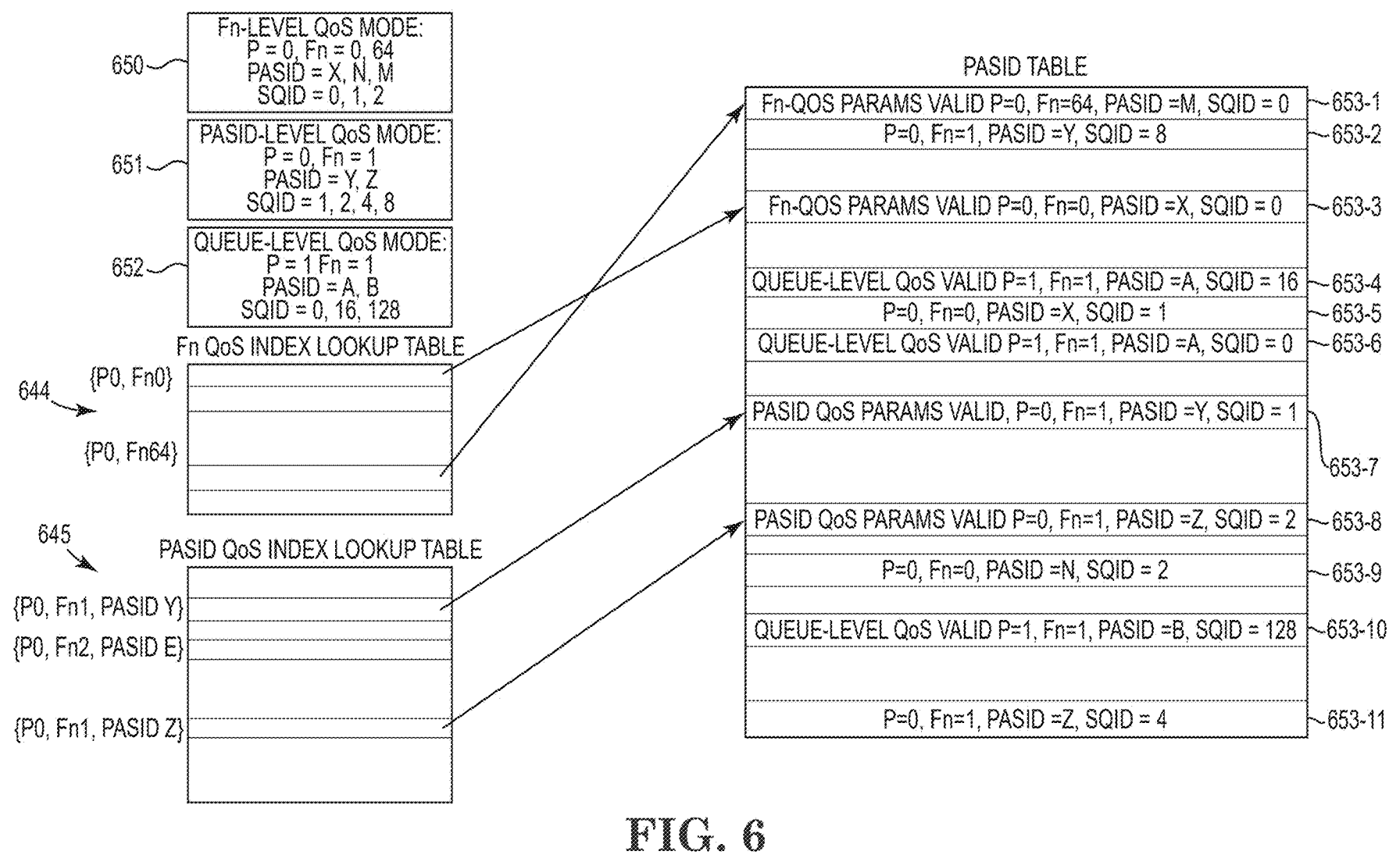

FIG. 6 is a block diagram illustrating an example view and correspondence between various tables described herein. The PASID table 622 is illustrated notationally as it can appear to the host. The indications of QoS at the function level 650, QOS at the PASID level 651, and QoS at the submission queue level 652, as well as the function QoS index lookup table 644 and PASID QoS index lookup table 645 are illustrated notationally as they can appear to the memory subsystem. The arrows between the function QoS index lookup table 644 and the PASID table 622 (e.g., entry 653-1 and entry 653-3) indicate a correspondence between entries in those respective tables. The arrows between the PASID QoS index lookup table 645 and the PASID table 622 (e.g., entry 653-7 and entry 653-8) indicate a correspondence between entries in those respective tables. PASID table entry 653-5 and entry 653-9 correspond to the indication of QoS at the function level 650. PASID table entry 653-2 and entry 653-11 correspond to the indication of QoS at the PASID level 651. PASID table entry 653-4, entry 653-6, and entry 653-10 correspond to the indication of QoS at the submission queue level 652.

Figure 7:
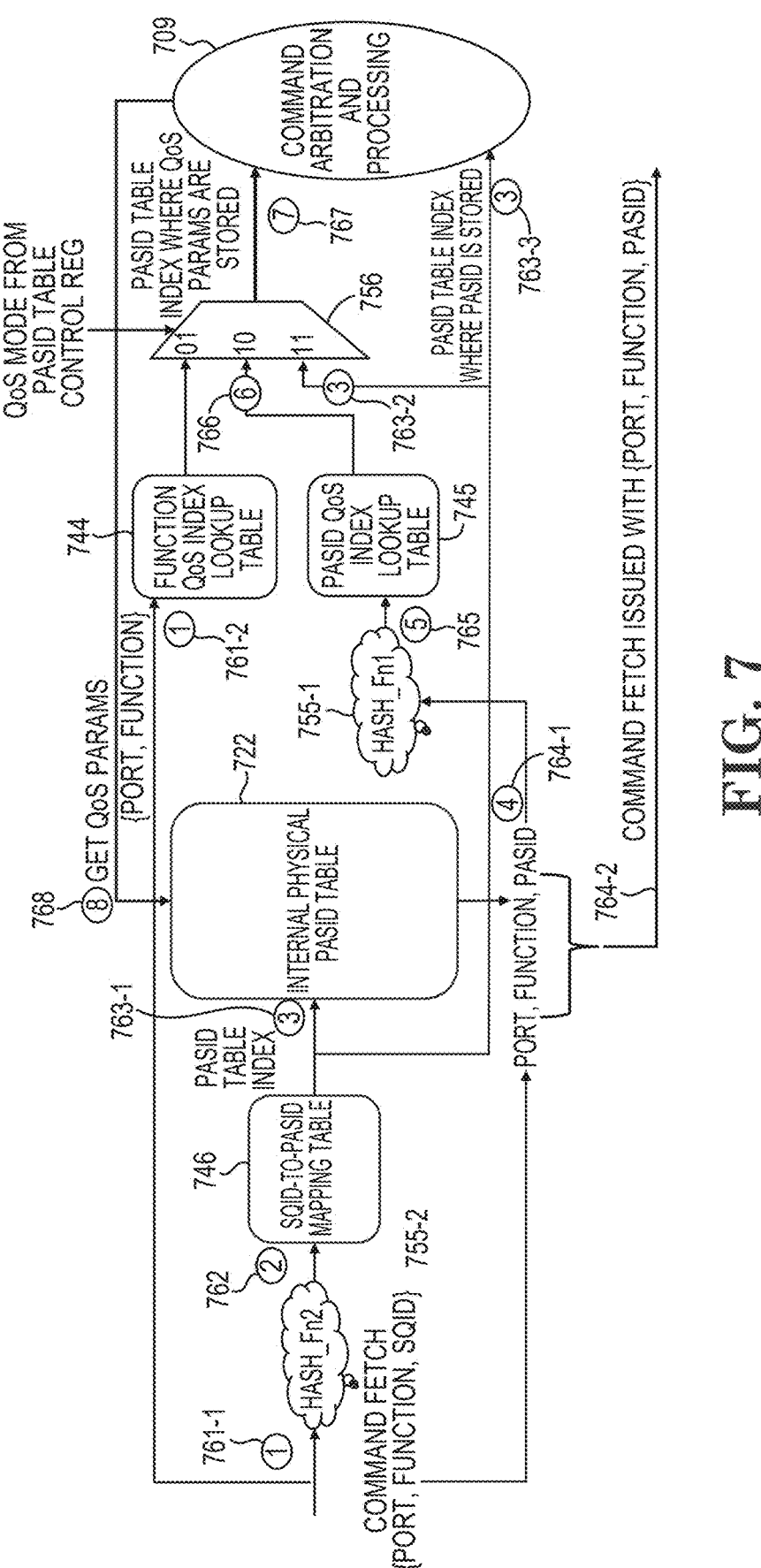
FIG. 7 is a flow diagram illustrating an example of a quality of service (QOS) index lookup in different QoS modes.

FIG. 7 is a flow diagram illustrating an example of a quality of service (QOS) index lookup in different QoS modes. At 761-1, memory subsystem traffic can be initiated with a command fetch (e.g., based on a port, function and SQID), which can be hashed using a hash function 755-2 as described herein. At 762, the memory subsystem can use the index and/or hashed index to search the SQID to PASID mapping table 746 to retrieve a relevant PASID table index. The PASID table index can be used to search the PASID table 722, as indicated at 763-1, to find a corresponding PASID. The PASID table index can be provided to multiplexor as indicated at 763-2 and to the processing logic 709 (e.g., "command arbitration and processing") as illustrated at 763-3. The PASID can replace the SQID in the original command fetch, such that the port, function, and PASID are issued as an actual command fetch as indicated at 764-2. The port, function, and PASID can also be hashed by a hash function 755-1 as indicated at 764-1. The output of this hash can be used to index the PASID QoS index lookup table 745 as indicated at 765. The output of the PASID QoS index lookup table 745 can be input to the multiplexor 756 as indicated at 766.

The original command fetch can be used to search the function QoS index lookup table 744 as indicated at 761-2. The output of the function QoS index lookup table 744 can be input the multiplexor 756. The multiplexor 756 can receive an indication of a QoS mode from a control register, such as an address translation services (ATS) register, which can translate DMA addresses to cached addresses in the memory subsystem. Based on the operative QoS mode, the multiplexor 756 can output one of the three inputs thereto to the processing logic 709 as indicated at 767. If QoS at the function level is operative, then the multiplexor 756 can output the input from the function QoS index lookup table 744. If QoS at the PASID level is operative, then the multiplexor 756 can output the input from the PASID QOS index lookup table 745. If QoS at the submission queue level is operative, then the multiplexor 756 can output the input from the SQID to PASID mapping table 746. The processing logic 709 can receive the output from the multiplexor 756 at 767 and in response, the processing logic 709 can use that input to get the corresponding QoS parameters from the PASID table 722 as indicated at 768.

Figure 8:
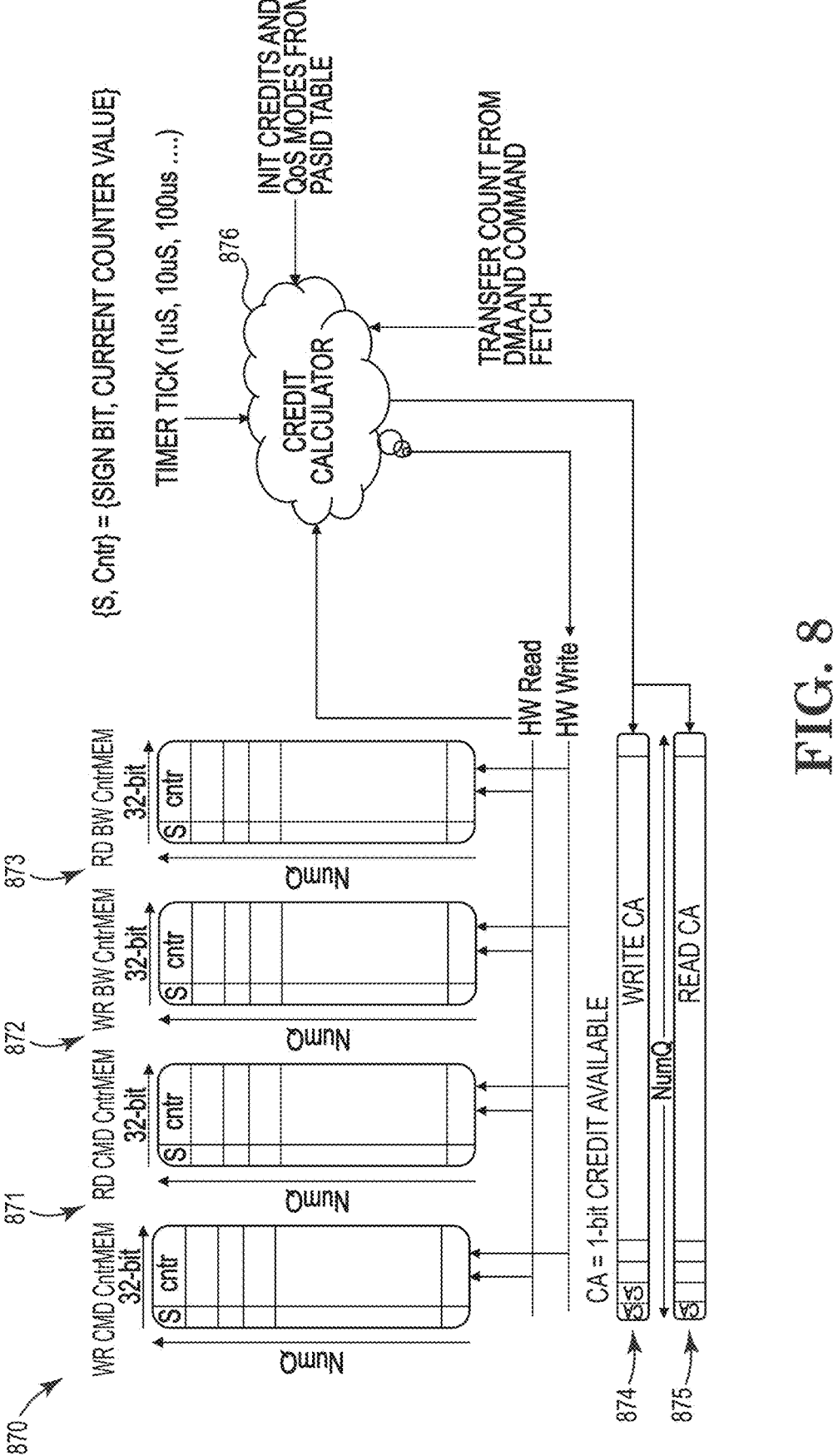
FIG. 8 is a flow diagram illustrating an example of various counters operating in association with QoS for storage.

FIG. 8 is a flow diagram illustrating an example of various counters operating in association with QoS for storage. The counters can be components of the memory subsystem, and in particular, of the controller of the memory subsystem. More particularly, the counters can be implemented in SRAM of the controller. The circuitry illustrated in FIG. 8 can be used by the memory subsystem to monitor read and write commands, bandwidth, and credits for each process for which QoS is being applied by the memory subsystem in order to enforce the specified QoS parameters.

The various counters include a write command counter 870, a read command counter 871, a write bandwidth counter 872 and a read bandwidth counter 873. Each counter can have memory associated therewith to store a respective count. Each counter can store a respective count for each process for which QoS is being applied by the memory subsystem. As described herein, the counts can be maintained for different queues, functions, and/or PASIDs depending on at what level QoS is being enforced. The counters can store counts of values associated with each process, (e.g., commands executed on behalf of the process, bandwidth used by the process, etc.). The write command counter 870 and read command counter 871 can be decremented at the time of command fetch and validation. The write bandwidth counter 872 and read bandwidth counter 873 can be decremented after doing transfers to or from host memory.

The memory subsystem can include QoS parameter registers, such as a write credit available register 874 and a read credit available register 875. The credit available registers 874, 875 can be configured to track respective values of credits available to different processes.

A credit calculator 876 can receive a clock input ("timer tick") at a granularity corresponding to the granularity for credit accounting of the various QoS parameters as established by the host, for example, in the fourth data word in the PASID table as described above with respect to FIG. 3. The various counters can be incremented when a timer tick arrives. The credit calculator 876 can receive additional inputs indicating initial credits and QoS modes from the PASID table. The credit calculator 876 can receive an input indicating a transfer count from DMA and command fetches for the various processes. The credit calculator 876 can monitor hardware user process operations such as reads and writes, monitor and/or update the various counters, calculate updated credits available, and write the updated credits available to the credit available registers 874, 875. Credit arbitration can be performed on a per QoS mode basis and then a collective credit arbitration can be performed on an overall basis after the per QoS mode arbitration. Only those SQs that have positive credits are picked for command fetch and/or processing. Other SQs have to wait until enough ticks pass that their credits go positive.

The following pseudocode can be used to operate the circuitry illustrated in FIG. 8:

```
if(transfer_done) {
   data_in[cntr_idx] = data_out_from_sram[ctr_idx] − transfer_units; // Read-
   modify-write counter sram for the counter associated with this transfer −
   cntr_idx
   Credit_available = (qos_mode == 0) ? 1 : (data_in[cntr_idx] > 0); }
If(timer_tick) { // Timer Tick has arrived
   for(i = 0; I < NUM_Q; i++) {// For each Queue, do this
      if(qos_mode == 1) {// From PASID Table
         updated_credits = data_out_from_sram[i] +
init_credits_from_PASID_Table;
         data_in[i] = (updated_credits > init_credits) ? Init_credits :
updated_credits;
   } else if(qos_mode == 2) {
      if(data_out_from_sram[i] == max_allocated)
         data_in = max_allocated;   else
      data_in[i] = data_out_from_sram[i] + credit_multiplier_scale *
init_credits_from_PASID_Table;
   }
   credit_available[i] = (qos_mode[i] == 0) ? 1 : (data_in[i] > 0);
   }
}
```

The "credit available" line can prevent a negative value. The "else if" line can allow more credits to accumulate for a given process. The pseudocode includes two threads running in parallel. When a transfer is done (command is completed), the amount of data is subtracted from the available credit by performing a read, modify, write to the stored credits available. The counter index can be the QoS index.

FIG. 9 is a flow diagram illustrating an example of a method for memory subsystem supported quality of service levels for virtualized storage. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by the QoS circuitry 109 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 980, the method can include advertising, by a memory subsystem coupled to a host, those QoS levels supported by the memory subsystem of a group of QoS levels. Advertising the QoS levels can be done by storing data indicative of those QoS levels supported by the memory subsystem in a vendor-specific register of the memory subsystem. The group of QoS levels can include the function level 950, the PASID level 951, and the SQ level 952.

At block 981, the method can include receiving, from the host by the memory subsystem, a definition of QoS parameters for at least one of the group of QoS levels. The definition of the QoS parameters can be stored in a table in an MMIO region of the memory subsystem referenced by the vendor-specific register. In some embodiments, a definition of respective QoS parameters can be received for each of a number of functions, each of a number of PASIDs, and/or each of a number of submission queues. As described herein, examples of QoS parameters include write commands per unit interval, read commands per unit interval, write data per unit interval, and read data per unit interval, among others.

At block 982, the method can include providing, by the memory subsystem, input/output virtualized (IOV) storage for a plurality of user processes associated with the host while enforcing the QoS parameters at the at least one of the group of QoS levels via hardware of the memory subsystem. In some embodiments, providing IOV storage can include enforcing the respective QoS parameters for each of a number of functions, each of a number of PASIDs, each of a number of submission queues, each of a number of submission queues belonging to a particular function, and/or each of a number of submission queues belonging to a particular PASID. IOV storage can be provided for one or more of a number of VCIs provisioned by the host, a number of user processes running on a number of VCIs provisioned by the host, and/or a number of processes running directly on the host.

Figure 10:
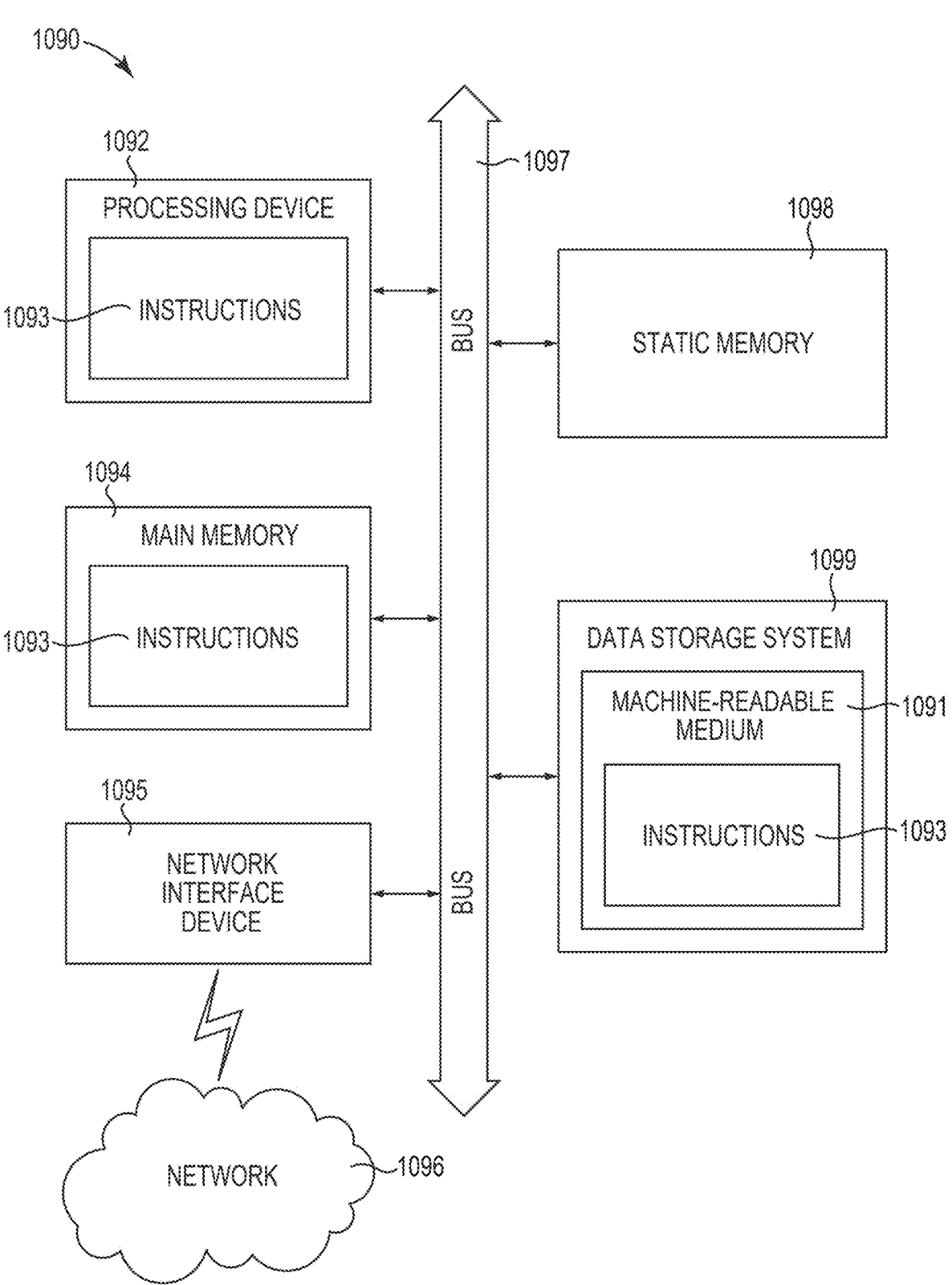
FIG. 10 illustrates an example of a system within which a set of instructions for causing the system to perform one or more of the methodologies discussed herein, can be executed.

FIG. 10 illustrates an example of a system 1090 within which a set of instructions for causing the system 1090 to perform one or more of the methodologies discussed herein, can be executed. In some embodiments, the system 1090 can correspond to a host system (e.g., the host system 102 of FIG. 1) that includes, is coupled to, or utilizes a memory subsystem (e.g., the memory subsystem 103 of FIG. 1) or can be used to perform the operations of a controller (e.g., the controller 104 of FIG. 1). In alternative embodiments, the system 1090 can be connected (e.g., networked) to other systems in a LAN, an intranet, an extranet, and/or the Internet. The system 1090 can operate in the capacity of a server or a client system in client-server network environment, as a peer system in a peer-to-peer (or distributed)

network environment, or as a server or a client system in a cloud computing infrastructure or environment.

The system 1090 can be a personal computer (PC), a tablet PC, a set-top box (STB), a Personal Digital Assistant (PDA), a cellular telephone, a web appliance, a server, a network router, a switch or bridge, or another system capable of executing a set of instructions (sequential or otherwise) that specify actions to be taken by that system. Further, while a single system is illustrated, the term "system" shall also be taken to include a collection of systems that individually or jointly execute a set (or multiple sets) of instructions to perform one or more of the methodologies discussed herein.

The example system 1090 includes a processing device 1092, a main memory 1094 (e.g., ROM, flash memory, DRAM such as SDRAM or Rambus DRAM (RDRAM), etc.), a static memory 1098 (e.g., flash memory, static random access memory (SRAM), etc.), and a data storage system 1099, which communicate with each other via a bus 1097.

The processing device 1092 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 1092 can also be one or more special-purpose processing devices such as an ASIC, a FPGA, a digital signal processor (DSP), network processor, or the like. The processing device 1092 is configured to execute instructions 1093 for performing the operations and steps discussed herein. The system 1090 can further include a network interface device 1095 to communicate over the network 1096.

The data storage system 1099 can include a machine-readable storage medium 1091 (also known as a computer-readable medium) on which is stored one or more sets of instructions 1093 or software embodying one or more of the methodologies or functions described herein. In various examples, the machine-readable storage medium 1091 can be non-transitory. The instructions 1093 can also reside, completely or at least partially, within the main memory 1094 and/or within the processing device 1092 during execution thereof by the system 1090, the main memory 1094 and the processing device 1092 also constituting machine-readable storage media. The machine-readable storage medium 1091, data storage system 1099, and/or main memory 1094 can correspond to the memory subsystem 103 of FIG. 1.

In one embodiment, the instructions 1093 include instructions to implement functionality corresponding to the QoS circuitry 109 of FIG. 1. While the machine-readable storage medium 1091 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
advertising, by a memory subsystem coupled to a host, those quality of service (QOS) levels supported by the memory subsystem of a group of QoS levels, the group comprising:
function level;
process address space identifier (PASID) level; and
submission queue level;
receiving, from the host by the memory subsystem, a definition of QoS parameters for at least one of the group of QoS levels; and
providing, by the memory subsystem, input/output virtualized (IOV) storage for a plurality of user processes associated with the host while enforcing the QoS parameters at the at least one of the group of QoS levels via hardware of the memory subsystem.

2. The method of claim 1, wherein advertising those QoS levels supported by the memory subsystem comprises storing data indicative of those QoS levels supported by the memory subsystem in a vendor-specific register of the memory subsystem; and
wherein the method further comprises storing the definition of the QoS parameters in a table in a memory mapped input/output (MMIO) region of the memory subsystem referenced by the vendor-specific register.

3. The method of claim 1, wherein receiving the definition of QoS parameters for at least one of the group of QoS levels comprises receiving a definition of respective QoS parameters for each of a plurality of functions.

4. The method of claim 3, wherein providing IOV storage comprises enforcing the respective QoS parameters defined for each of a plurality of PASIDs and each of a plurality of submission queues belonging to a particular function of the plurality of functions.

5. The method of claim 1, wherein receiving the definition of QoS parameters for at least one of the group of QoS levels comprises receiving a definition of respective QoS parameters for each of a plurality of PASIDs.

6. The method of claim 5, wherein providing IOV storage comprises enforcing the respective QoS parameters for each of a plurality of submission queues belonging to a particular PASID of the plurality of PASIDs.

7. The method of claim 1, wherein receiving the definition of QoS parameters for at least one of the group of QoS levels comprises receiving a definition of respective QoS parameters for each of a plurality of submission queues; and
wherein providing IOV storage comprises enforcing the respective QoS parameters for each of a plurality of submission queues.

8. The method of claim 1, wherein receiving the definition of QoS parameters comprises receiving the definition of one or more of a group of QoS parameters comprising:
write commands per unit interval;
read commands per unit interval;
write data per unit interval; and
read data per unit interval.

9. The method of claim 1, wherein the plurality of user processes include one or more of:
a plurality of virtualized computing instances (VCIs) provisioned by the host;

a plurality of user processes running on a plurality of VCIs provisioned by the host; and
a plurality of user processes running directly on the host.

10. An apparatus comprising:
a host interface;
a register;
a memory device; and
a controller coupled to the host interface, the register, and the memory device, wherein the controller is configured to:
allow a host to access at least a portion of the register via the host interface;
cause a respective capability indicator for each of a plurality of quality of service (QOS) levels to be stored in the register;
wherein the respective capability indicator is readable by the host; and
wherein the plurality of QoS levels include a function level, a process address space identifier (PASID) level, and a submission queue level;
read a selection of one of the plurality of QoS levels written to the register by the host;
read a definition of QoS parameters written to the register by the host; and
provide input/output virtualized (IOV) storage via the memory device for a plurality of user processes associated with the host while enforcing the QoS parameters at the selected QoS level.

11. The apparatus of claim 10, wherein the controller includes a QoS parameter register configured to track respective values of credits available to the plurality of user processes.

12. The apparatus of claim 11, wherein the controller includes a plurality of hardware counters coupled to a credit calculator and a clock input;
wherein the plurality of counters are configured to be incremented based on the clock input;
wherein the credit calculator is configured to:
receive an input indicating respective initial credits for the plurality of user processes;
update the various counters based on user process operations;
calculate updates to the respective initial credits; and
write the updates to the hardware registers.

13. The apparatus of claim 12, wherein to enforce the QoS parameters, the controller is configured to perform credit arbitration on a per QoS mode basis and collective credit arbitration on an overall basis thereafter.

14. The apparatus of claim 10, further comprising an address translation cache coupled to the register and the host interface;
wherein the address translation cache is configured to store physical addresses corresponding to user space addresses tagged in the PASID table.

15. The apparatus of claim 14, further comprising physical region page/scatter gather list (PRP/SGL) fetch circuitry coupled to the register and the host interface;
wherein the PRP/SGL fetch circuitry is configured to determine whether user space addresses have been translated before.

16. The apparatus of claim 10, wherein the plurality of QOS parameters include write commands per unit interval, read commands per unit interval, write data per unit interval, and read data per unit interval.

17. The apparatus of claim 10, wherein the register comprises a plurality of registers in a mapped input/output (MMIO) region of the apparatus.

18. A system, comprising:

a memory subsystem, comprising:

a register;

a memory device; and a controller coupled to the memory device and the register; and a host including host memory and a host processor, wherein the host is coupled to the memory subsystem and configured to:

provision a plurality of user processes;

read the register to discover quality of service (QOS) level capabilities of the memory subsystem;

write to the register to select a QoS level; and write to the register to define QoS parameters for the selected QoS level;

wherein the controller is configured to provide input/output virtualized (IOV) storage via the memory device for the plurality of user processes while enforcing the QoS parameters at the selected QoS level.

19. The system of claim 18, wherein the host is configured to write to the register to store definitions of a credit structure for the QoS parameters.

20. The system of claim 18, wherein the plurality of user processes include one or more of a group of user processes including:

VCIs running on a hypervisor of the host;

user processes running inside a VCI; and user process running directly on the host memory and the host processor.

\* \* \* \* \*